(12) United States Patent
Williams et al.

(10) Patent No.: US 11,623,502 B1
(45) Date of Patent: Apr. 11, 2023

(54) TRUCK BED COVERS INCLUDING CARGO MANAGEMENT SYSTEMS

(71) Applicant: Toyota Motor Engineering & Manufacturing North America, Inc., Plano, TX (US)

(72) Inventors: Paxton S. Williams, Milan, MI (US); Scott L. Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1 day.

(21) Appl. No.: 17/490,527

(22) Filed: Sep. 30, 2021

(51) Int. Cl.
| | | |
|---|---|---|
| *B60J 7/14* | (2006.01) | |
| *B60P 7/02* | (2006.01) | |
| *B60R 7/08* | (2006.01) | |
| *B60J 7/16* | (2006.01) | |

(52) U.S. Cl.
CPC ............ *B60J 7/141* (2013.01); *B60J 7/1607* (2013.01); *B60P 7/02* (2013.01); *B60R 7/08* (2013.01)

(58) Field of Classification Search
CPC . B60J 7/141; B60J 7/1607; B60P 7/02; B60P 7/06; B60R 7/08

USPC .......................... 296/100.02, 100.06, 100.09
See application file for complete search history.

(56) References Cited

U.S. PATENT DOCUMENTS

| | | | |
|---|---|---|---|
| 5,427,288 A | 6/1995 | Trubee | |
| 6,585,309 B2 * | 7/2003 | Dicke | B60R 11/06 |
| | | | 296/100.1 |
| 7,028,872 B2 | 4/2006 | Lobanoff | |
| 7,644,972 B2 | 1/2010 | Lim | |
| 8,858,139 B2 | 10/2014 | Prottengeier et al. | |
| 9,487,248 B1 * | 11/2016 | Buckhalt | B60J 7/141 |
| 9,682,733 B2 * | 6/2017 | Krishnan | B60J 7/1607 |
| 10,053,020 B2 | 8/2018 | Krishnan et al. | |
| 10,875,392 B2 * | 12/2020 | Williams | F26B 19/005 |
| 11,027,602 B1 * | 6/2021 | Amble | B60P 7/02 |
| 11,046,161 B2 * | 6/2021 | Williams | D06F 57/125 |
| 2008/0142560 A1 | 6/2008 | Lim | |

FOREIGN PATENT DOCUMENTS

DE      102017122334 A1 *   3/2018   ............. B60J 7/106

* cited by examiner

*Primary Examiner* — Jason S Daniels
(74) *Attorney, Agent, or Firm* — Dinsmore & Shohl LLP (57) ABSTRACT

A truck bed cover for a pickup truck includes a panel sized to cover at least a portion of a truck bed. A moveable carrier assembly is connected to an underside of the panel. The moveable carrier assembly includes multiple carrier members including hooks that move underneath the panel in both vehicle longitudinal and vehicle lateral directions.

17 Claims, 11 Drawing Sheets

TRUCK BED COVERS INCLUDING CARGO MANAGEMENT SYSTEMS

TECHNICAL FIELD

The present specification generally relates to truck bed covers and, more specifically, to truck bed covers that provide cargo management systems including moveable carrier assemblies attached to the truck bed covers that can be used to manage items in the truck bed, such as shopping bags.

BACKGROUND

Pickup trucks often have open top truck beds that are exposed to environmental conditions, such as rain, sun, etc. Truck bed covers, sometimes referred to as tonneau covers, are known that cover the truck beds and provide some barrier to the environment and some added security for items in the truck bed. Different types of truck bed covers are available. One such truck bed cover is a single-piece panel that is hingedly connected on a forward wall on the truck bed. Another type of truck bed cover is formed as a flexible substrate that can be rolled and unrolled to cover the truck bed. Yet another type of truck bed cover is formed of multiple panels that are hingedly connected to one another to fold and unfold between open and closed positions. While truck bed covers may be useful in providing a barrier to the truck bed, the truck bed covers can also make accessing contents in the truck beds more cumbersome. Accordingly, what is needed are truck bed covers with moveable carrier assemblies attached thereto that can be used to manage items within the truck beds.

SUMMARY

In accordance with one embodiment, a truck bed cover for a pickup truck includes a panel sized to cover at least a portion of a truck bed. A moveable carrier assembly is connected to an underside of the panel. The moveable carrier assembly includes multiple carrier members including hooks that move underneath the panel in both vehicle longitudinal and vehicle lateral directions.

In accordance with another embodiment, a method of providing a cargo management system in a truck bed of a truck is provided. The method includes connecting a moveable carrier assembly to a panel of a truck bed cover that is sized and configured to cover at least a portion of the truck bed. The carrier assembly includes multiple carrier members including hooks that move underneath the panel in both vehicle longitudinal and vehicle lateral directions. The truck bed cover is connected to the truck bed.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Pickup trucks according to the present specification include a passenger cabin and a truck bed located rearward of the passenger cabin. A truck bed cover is sized to cover the truck bed and movably attaches to walls of the truck bed to allow the truck bed cover to be moved between open and closed configurations. A cargo management system including a moveable carrier assembly is mounted to the truck bed cover. The moveable carrier assembly may include a carousel assembly that includes a shaft that is mounted to the truck bed cover and a wheel assembly that is rotatable connected to the shaft. The wheel assembly may include one or more supports to which hooks or other carrier members are attached. The wheel assembly can rotate 360 degrees to move items hanging or otherwise carried by the carrier members toward a rear opening of the truck bed for greater accessibility. In some embodiments, a moveable track assembly may be provided that extends across an underside of the truck bed cover in both vehicle longitudinal and lateral directions.

Figure 1:
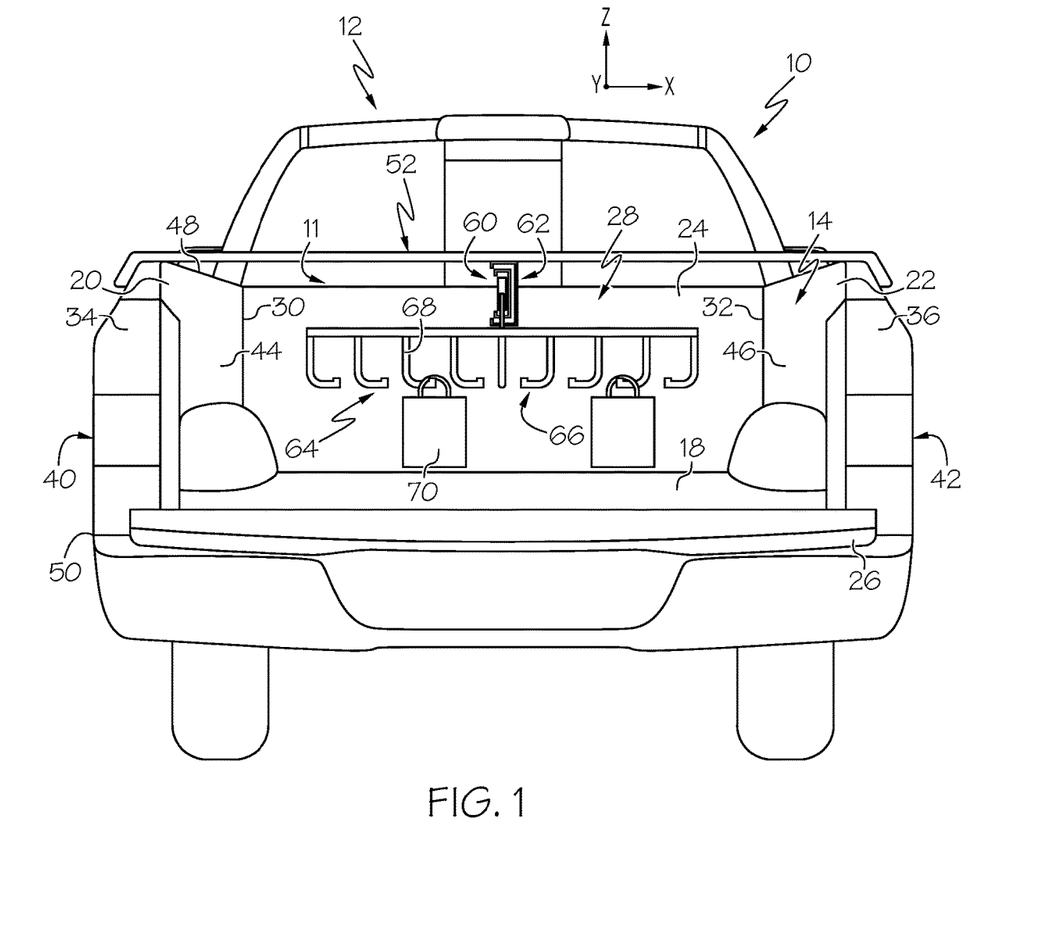
FIG. 1 schematically depicts a rear view of a pickup truck having a truck bed with a truck bed cover and cargo management system, according to one or more embodiments shown and described herein.

As used herein, the term "vehicle longitudinal direction" refers to the forward-rearward direction of the pickup truck (i.e., in the vehicle Y direction depicted in FIG. 1). The term "vehicle lateral direction" refers to the cross-pickup truck direction (i.e., in the vehicle X direction depicted in FIG. 1), and is transverse to the vehicle longitudinal direction. The term "vehicle vertical direction" refers to the upward-downward direction of the pickup truck (i.e., in the vehicle Z-direction depicted in FIG. 1). As used herein, "upper," "over" and "above" are defined as the positive Z direction of the coordinate axis shown in the drawings. "Lower," "under," and "below" are defined as the negative Z direction of the coordinate axis shown in the drawings.

Referring to FIG. 1, the terms "outboard" or "outward" as used herein refers to the relative location of a component in a direction with respect to a pickup truck centerline. The term "inboard" or "inward" as used herein refers to the relative location of a component in a direction with respect to the pickup truck centerline. Because the pickup truck structures may be generally symmetrical about the pickup truck centerline, the direction to which use of terms "inboard," "inward," "outboard" and "outward" refer may be mirrored about the pickup truck centerline when evaluating components positioned along opposite sides of the pickup truck 10.

A pickup truck 10 includes a cargo management system 11. The pickup truck 10 includes a passenger cabin 12 and a truck bed 14. The truck bed 14 includes a floor 18, a pair of spaced apart sidewalls 20, 22, a front wall 24, and a rear wall 26. The floor 18, the sidewalls 20, 22, the front wall 24, and the rear wall 26 define a storage area 28 of the truck bed 14.

The sidewalls 20, 22 extend parallel to the vehicle longitudinal direction. Each sidewall 20, 22 includes a front end 30, 32 and an opposite rear end 34, 36. The front wall 24 extends between the front ends 30, 32 of the sidewalls 20, 22. The rear wall 26 extends between the rear ends 34, 36 of the sidewalls 20, 22.

In some embodiments, it is appreciated, that the rear wall 26 is pivotally connected to the sidewalls 20, 22 as a tailgate for movement between a closed position and an open position. In the closed position, the rear wall 26 extends parallel to the vehicle vertical direction. In the open position, the rear wall 26 extends parallel to the vehicle longitudinal direction.

The sidewalls 20, 22 include an exterior wall panel 40, 42 and an opposite interior wall panel 44, 46. The sidewalls 20, 22 include upper ends 48 and opposite lower ends 50. The lower ends 50 are positioned closer to the floor 18 of the truck bed 14 than the upper ends 48. The sidewalls 20 and 22 may include a sidewall cover that is used to cover the upper ends 48.

A truck bed cover 52 is releasably connected to the sidewalls 20 and 22 and extends over the truck bed 14. The truck bed cover 52 includes at least one panel that is hingedly attached to the front wall 24 to allow for moving the truck bed cover 52 between open and closed configurations. In the example of FIG. 1, the truck bed cover 52 is in the closed configuration.

A moveable carrier assembly 60 is mounted to an underside of the truck bed cover 52. The moveable carrier assembly 60, in this embodiment, includes a carousel assembly 64 that is mounted to a track assembly 62 that is, in turn, mounted to the truck bed cover 52. As is described below, the carousel assembly 64 includes a spinning wheel assembly 66 that includes carrier members 68 (e.g., hooks) that can be used to carry items 70, such as shopping bags, tools, etc., closer to the rear wall 26 providing increased accessibility and ease of removal from the truck bed 14.

Figure 2:
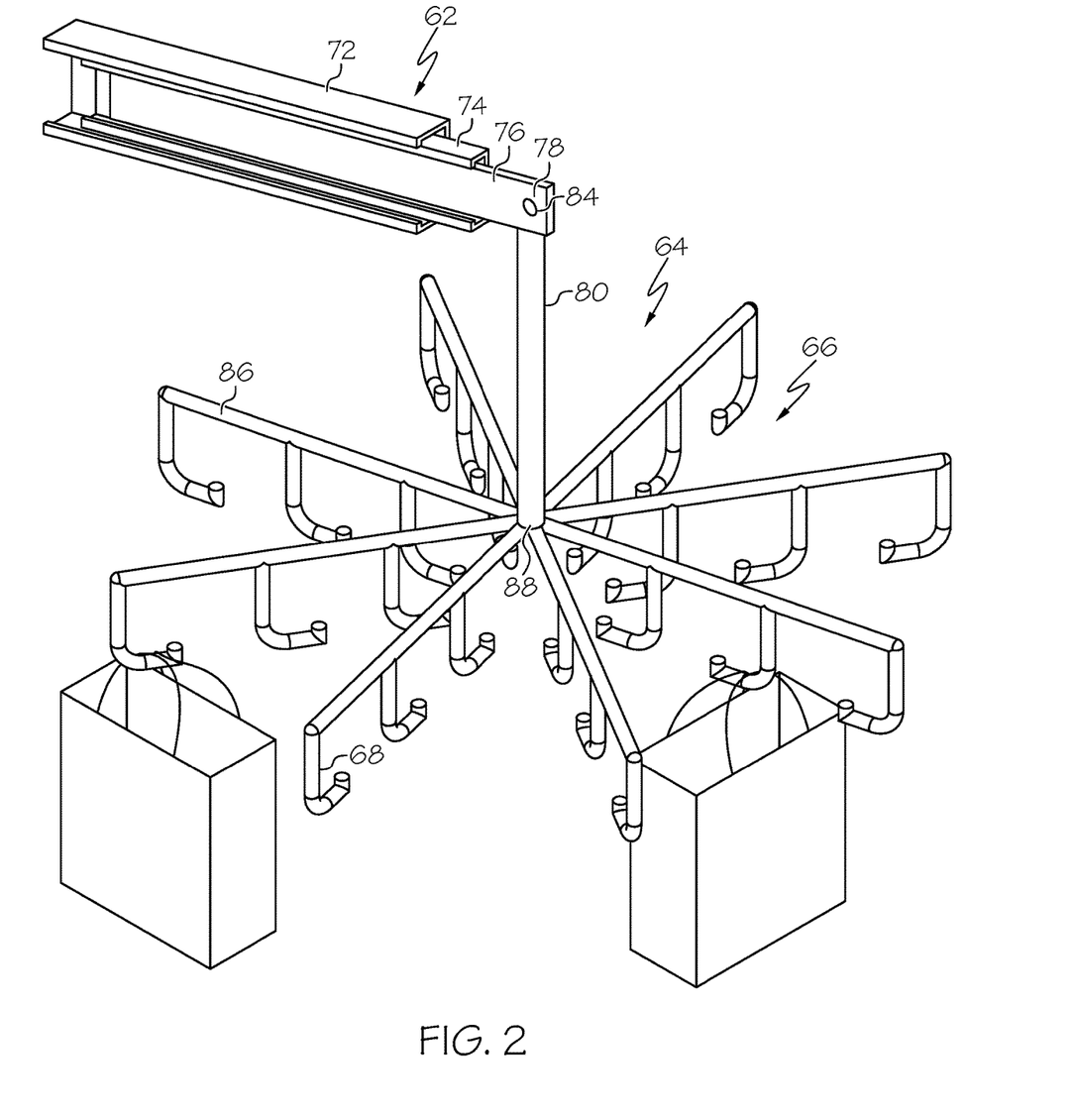
FIG. 2 schematically depicts a perspective view of the cargo management system of FIG. 1 in isolation, according to one or more embodiments shown and described herein.

Referring to FIG. 2, the track assembly 62 includes a stationary member 72 that mounts to the truck bed cover 52, a first sliding member 74 and a second sliding member 76 that both telescope within the stationary member 72 with sliding movement relative to each other and the stationary member 72. While three members 72, 74 and 76 are shown, more or less than three stages can be used, such as two, e.g., a stationary member and a sliding member. Rollers or wheels may be provided to facilitate the sliding movement.

Connected at an end 78 of the second sliding member 76 is the carousel assembly 64. The carousel assembly 64 includes a shaft 80 and the wheel assembly 66. The shaft 80 may be releasably connected to the end 78 of the second sliding member 76. In the illustrated example, a hook 84 may be provided that allows for removable attachment of the carousel assembly 64 thereto. Such a removable arrangement can allow for interchanging of various carrier assemblies having, for example, different configurations and/or different sizes than the illustrated carousel assembly.

The wheel assembly 66 is rotatably mounted to the shaft 80. In some embodiments, the wheel assembly 66 may be rotatably mounted to the shaft 80 (e.g., using one or more bearings) such that the wheel assembly 66 can spin about a pivot axis that is provided by the shaft 80. In some embodiments, a locking mechanism, such as a ratchet, may be provided so that the wheel assembly can be locked in place and inhibited from unintended rotation.

The wheel assembly 66 includes one or more supports 86 to which carrier members 68 are connected. In some embodiments, the supports 86 may be in the form of arms that extend radially outward from a hub 88 that is rotatably connected to the shaft 80. The supports 86 may be straight, as shown, rounded, etc.; they may extend radially or around the hub 88 in any suitable shape, such as circular, polygonal, etc. The carrier members 68 are illustrated in the form of open-ended hooks, but may also be any suitable form, such as a latching hook. As can be appreciated, use of the track assembly 62 allows for linear motion of the carrier members 68 in the vehicle longitudinal direction and use of the carousel assembly 64 allows for rotational motion of the carrier members 68 below and relative to the truck bed cover 52. In other embodiments, the track assembly 62 may not be used and the carousel assembly 64 may be mounted directly to the truck bed cover 52 (FIG. 1).

Figure 3:
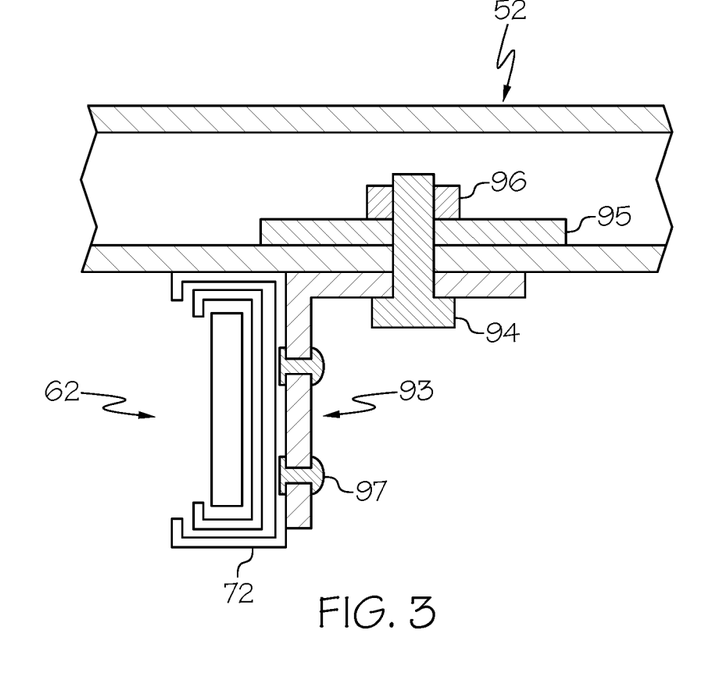
FIG. 3 schematically depicts a method of attaching a track assembly of the cargo management system of FIG. 2 to the truck bed cover, according to one or more embodiments shown and described herein.
Figure 4:
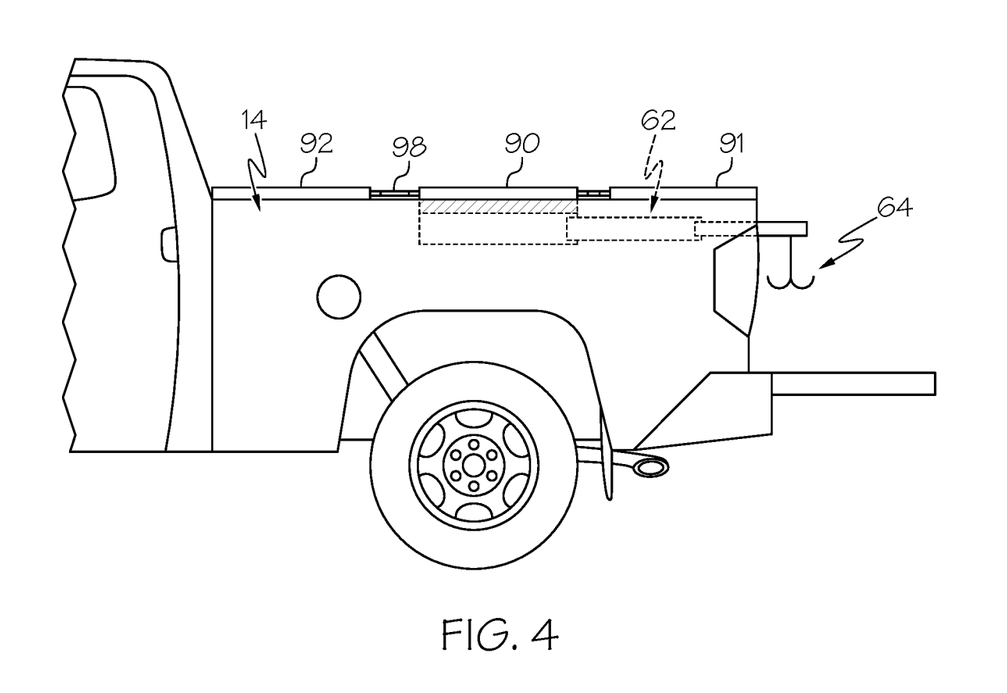
FIG. 4 schematically depicts a side view of the cargo management system of FIG. 1 in operation, according to one or more embodiments shown and described herein.
Figure 5:
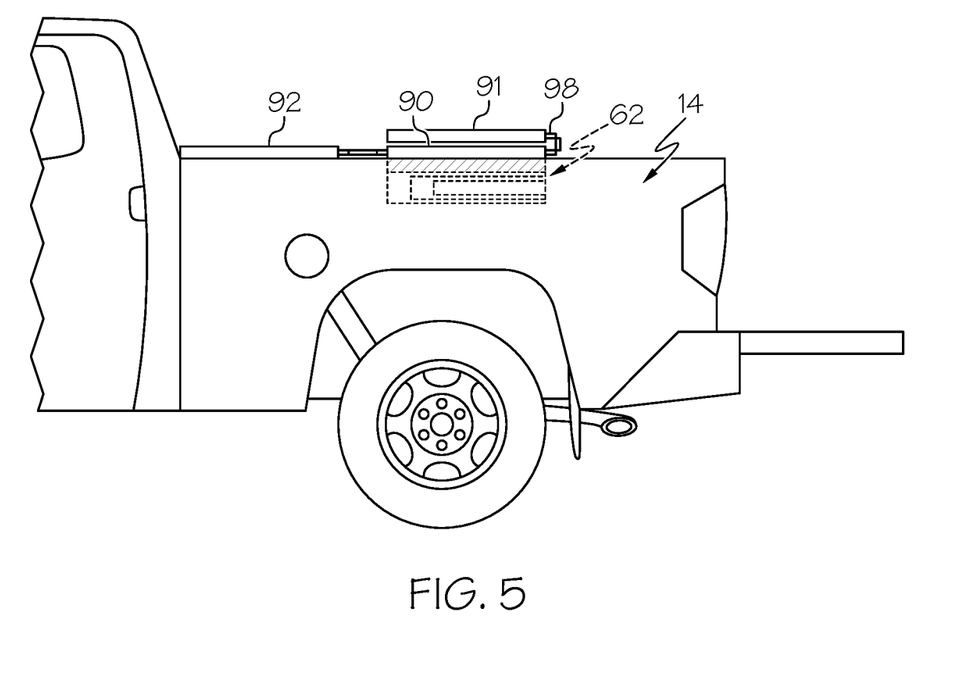
FIG. 5 schematically depicts a side view of the truck bed cover and track assembly in an open configuration, according to one or more embodiments shown and described herein.
Figure 6:
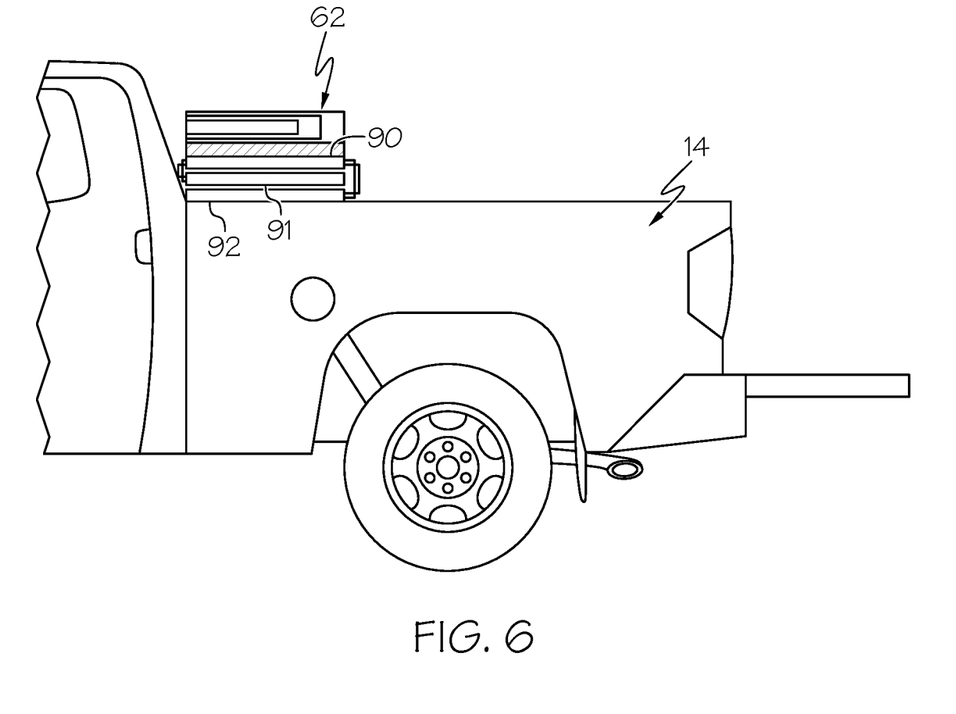
FIG. 6 schematically depicts a side view of the truck bed cover and track assembly in an open configuration, according to one or more embodiments shown and described herein.

FIG. 3 illustrates an example of how the track assembly 62 may be connected to the truck bed cover 52. FIGS. 4-6 illustrate the track assembly 62 connected to a middle panel 90 of a three-panel 90, 91 and 92 truck bed cover 52. Referring first to FIG. 3, the track assembly 62 may be connected to the truck bed cover 52 using a bracket 93 that, in this embodiment, is an angled bracket and a bolt 94 with washer 95 and nut 96. Rivets 97 may be used to connect the stationary member 72 to the bracket 93. As can be seen by FIGS. 4-6, the carousel assembly 64 can be extended outside the truck bed 14 using the track assembly 62. The panels 90, 91 and 92 may be connected together by hinges 98, which allows the panels 91 and 90 to be rotated above the front panel 92. As shown in FIG. 6, the track assembly 62 may be located above the middle panel 90 in an open configuration and the carousel assembly 64 may be folded and stowed.

Figure 7:
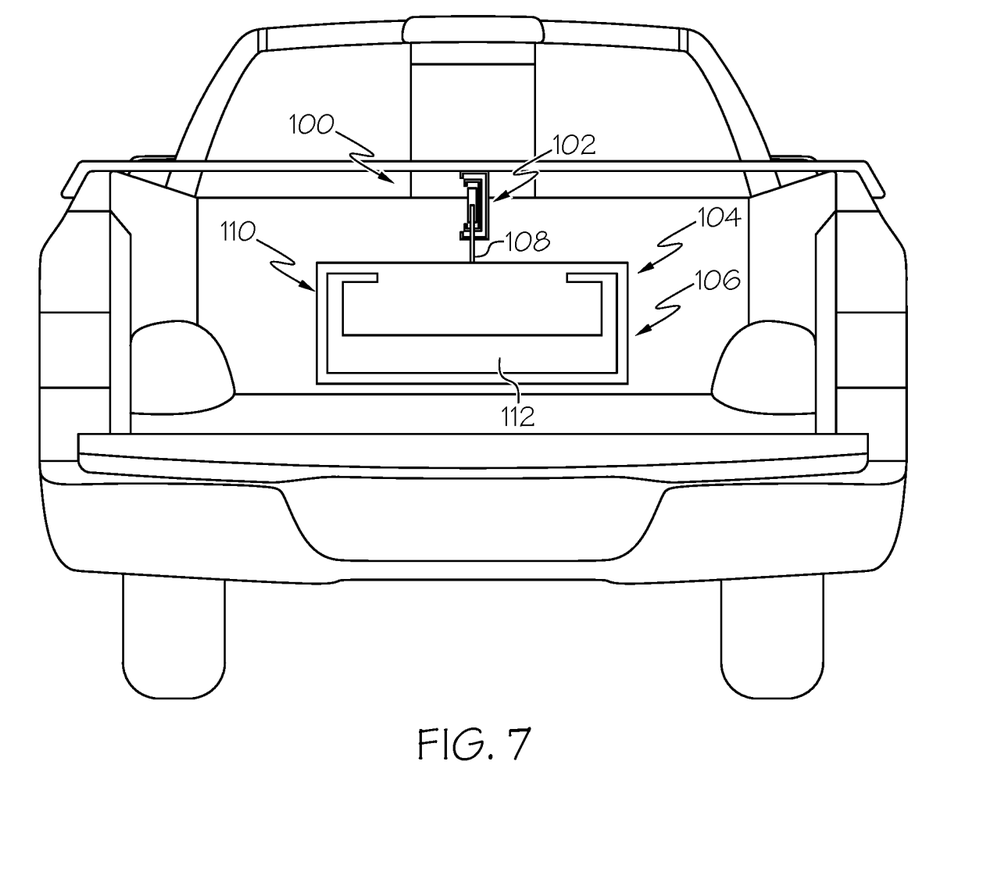
FIG. 7 schematically depicts a rear view of a pickup truck having a truck bed with another truck bed cover and cargo management system, according to one or more embodiments shown and described herein.
Figure 8:
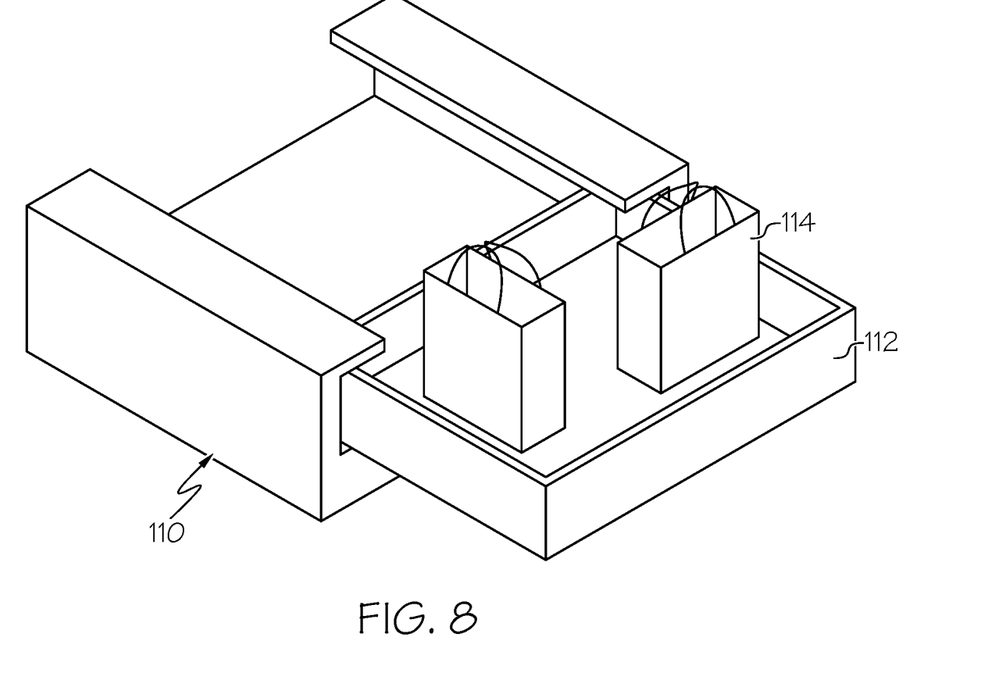
FIG. 8 schematically depicts parts of the cargo management system of FIG. 7 in isolation, according to one or more embodiments shown and described herein.

Referring to FIG. 7, another embodiment of a storage management system 100 is shown that also includes a track assembly 102, which can be similar to the track assembly 62 discussed above. A moveable carrier assembly 104 is connected to the track assembly 102 that includes a tray assembly 106. The tray assembly 102 includes a shaft 108 and a frame 110 that is mounted to the shaft 108. A carrier member 112 (a tray) is slidably supported by the frame 110 such that the tray 112 can slide between open and closed configurations. FIG. 8 illustrates the tray 112 and part of the frame 110 in and out of which the tray 112 can slide so that items 114 can be accessed and stowed.

Figure 9:
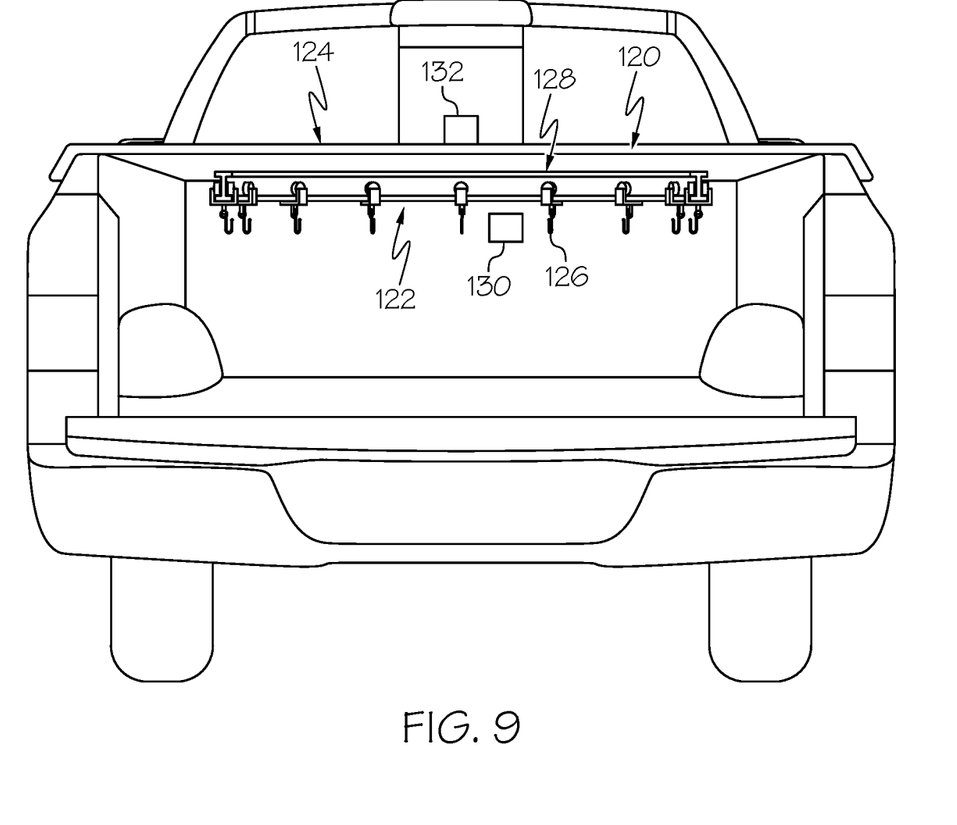
FIG. 9 schematically depicts a rear view of a pickup truck having a truck bed with another truck bed cover and cargo management system, according to one or more embodiments shown and described herein.
Figure 10:
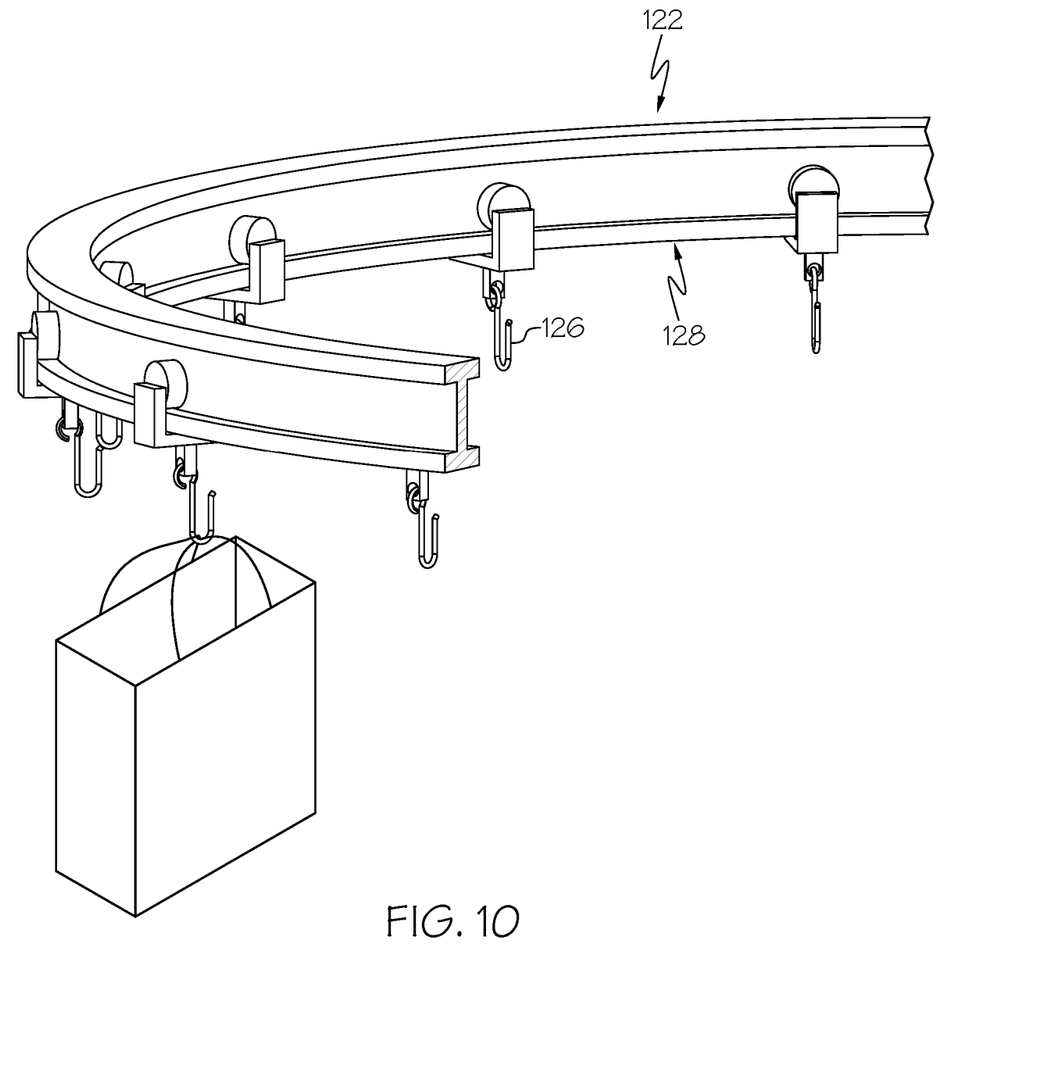
FIG. 10 schematically depicts the cargo management system of FIG. 9 in isolation, according to one or more embodiments shown and described herein.

Referring to FIGS. 9 and 10, another storage system 120 is illustrated that includes a track assembly 122 that extends in both the vehicle longitudinal and vehicle lateral directions underneath truck bed cover 124. As shown in FIG. 10, the track assembly 122 may be rounded (e.g., oval, circular, etc.) and includes carrier members 126 that move along a track 128 in both the vehicle longitudinal and lateral directions. The track assembly 122 may also be mounted to another track assembly similar to track assembly 62 of FIG. 2.

Figure 11:
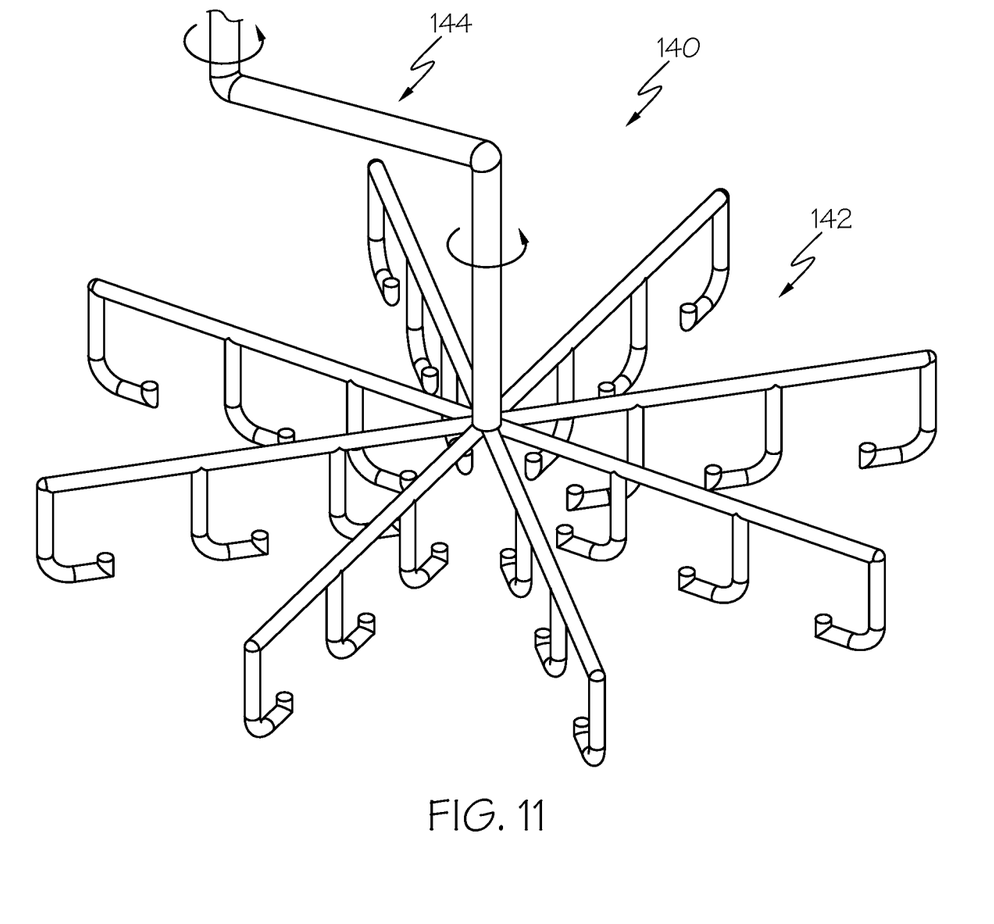
FIG. 11 illustrates another cargo management system, according to one or more embodiments shown and described herein.

Other carrier assemblies are contemplated that move in both vehicle longitudinal and lateral directions. For example, FIG. 11 illustrates another embodiment of a carrier assembly 140 that includes a carousel assembly 142 that is connected to a pivot arm 144 that connects to a truck bed cover.

It should be noted that any of the above track assemblies and carrier assemblies described herein may be motorized and operate based on an input from an operator, a signal from a sensor and/or a command from a vehicle ECU or other controller, such as a handheld computing device. The user input may be provided on the truck bed cover itself. For example, in the embodiment of FIG. 9, and any of the embodiments shown and described herein, a motor 130 may be provided that moves the carrier members 126 along the track 128 using a chain, cable, etc. For power, a battery pack 132 may be built into the truck bed cover that is charged by solar energy using a solar panel, also represented by element 132, on top of the truck bed cover and/or the vehicle battery may be used.

The above-described storage management systems include one or both of a carrier assembly and track assembly that allow carrier members to move below the truck bed covers in one or both the vehicle longitudinal and lateral directions. Multiple carrier assemblies and track assemblies may be provided for additional storage management. Providing the storage management systems can reduce reach issues and improves accessibility, inhibit unintended sliding around and spilling of items and space the items from the floor of the truck bed. Adding power and motorized movement can improve usability.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A truck bed cover for a pickup truck, the truck bed cover comprising:
    a panel sized to cover at least a portion of a truck bed; and
    a moveable carrier assembly connected to an underside of the panel, the moveable carrier assembly comprising multiple carrier members comprising hooks that move underneath the panel in both vehicle longitudinal and vehicle lateral directions.

2. The truck bed cover of claim 1, wherein the moveable carrier assembly comprises a carousel assembly comprising a wheel assembly.

3. The truck bed cover of claim 2, wherein the wheel assembly rotates 360 degrees.

4. The truck bed cover of claim 2 further comprising a track assembly that is mounted to the underside of the panel, the carousel assembly operably connected to the track assembly through a shaft.

5. The truck bed cover of claim 4, wherein the track assembly extends in the vehicle longitudinal and vehicle lateral directions.

6. The truck bed cover of claim 4, wherein the panel is a first panel, the truck bed cover comprising a second panel connected to the first panel and a third panel connected to the first panel.

7. The truck bed cover of claim 6, wherein the first panel is hingedly connected to the second panel such that the first panel rotates between open and closed configurations, the track assembly moving with the first panel as the first panel rotates between the open and closed configurations.

8. The truck bed cover of claim 1, wherein the moveable carrier assembly comprises a track assembly that is mounted to the panel, the track assembly extending in both the vehicle longitudinal and vehicle lateral directions, the carrier members moving along the track assembly.

9. A method of providing a cargo management system in a truck bed of a truck, the method comprising:
    connecting a moveable carrier assembly to a panel of a truck bed cover that is sized and configured to cover at least a portion of the truck bed, wherein the carrier assembly comprises multiple carrier members comprising hooks that move underneath the panel in both vehicle longitudinal and vehicle lateral directions; and
    connecting the truck bed cover to the truck bed.

10. The method of claim 9, wherein the moveable carrier assembly comprises a carousel assembly comprising a wheel assembly.

11. The method of claim 10, wherein the wheel assembly rotates 360 degrees and is motorized.

12. The method of claim 10 further comprising:
    mounting a track assembly to the underside of the panel; and
    connecting the carousel assembly to the track assembly through a shaft.

13. The method of claim 12, wherein the track assembly extends in the vehicle longitudinal and vehicle lateral directions.

14. The method of claim 12, wherein the panel is a first panel, the truck bed cover comprising a second panel connected to the first panel and a third panel connected to the first panel.

15. The method of claim 14 comprising hingedly connecting the first panel to the second panel such that the first panel rotates between open and closed configurations, the track assembly moving with the first panel as the first panel rotates between the open and closed configurations.

16. The method of claim 9 comprising mounting a track assembly to the panel, the track assembly extending in both the vehicle longitudinal and vehicle lateral directions, the carrier members moving along the track assembly.

17. The method of claim 9, wherein the truck bed cover comprises only a single panel.

* * * * *